United States Patent

[11] 3,588,873

| [72] | Inventors | Thomas E. Osborne<br>San Francisco;<br>Kay B. Magleby, Los Altos Hills; Joseph A. Lukes, Belmont, Calif. |
|---|---|---|
| [21] | Appl. No. | 774,821 |
| [22] | Filed | Nov. 12, 1968 |
| [45] | Patented | June 28, 1971 |
| [73] | Assignee | Hewlett-Packard Company<br>Palo Alto, Calif. |

[54] INFORMATION DISPLAY APPARATUS
7 Claims, 6 Drawing Figs.

[52] U.S. Cl. .................................. 340/324A, 340/336
[51] Int. Cl. .................................... G08b 23/00

[50] Field of Search ............................ 340/324.1, 336

[56] References Cited
UNITED STATES PATENTS
3,474,439  10/1969  Miner ............... 340/324.1

*Primary Examiner*—Ralph D. Blakeslee
*Attorney*—A. C. Smith

ABSTRACT: A cathode-ray display tube and associated sweep circuitry displays alphanumeric characters which are centered between adjacent characters and which are separated into groups of three characters to facilitate the prompt recognition of punctuation in a long series of characters.

*INVENTOR.*
THOMAS E. OSBORNE
KAY B. MAGLEBY
JOSEPH A. LUKES

BY *A.C. Smith*

ATTORNEY

INFORMATION DISPLAY APPARATUS

SUMMARY OF THE INVENTION

The present invention forms display characters or digits by selective blanking of portions of a "figure 8" sweep pattern that is formed from adjacent E-shaped and I-shaped sweep patterns on a cathode-ray display tube. More importantly, the displayed digits of the present invention are spaced in groups of three digits along a line of digits to permit visual recognition of conventional thousands grouping. Also, characters that are narrower than normal such as 1, Ii, radix point, or the like, are centered between adjacent characters by momentarily altering the electrical character-forming signals. Also, the repetition rates of the display sweeps are synchronized to a reference frequency to prevent variations in display intensity as the line or lines of display characters varies in length.

DESCRIPTION OF THE PREFERRED EMBODIMENT

Figure 1:
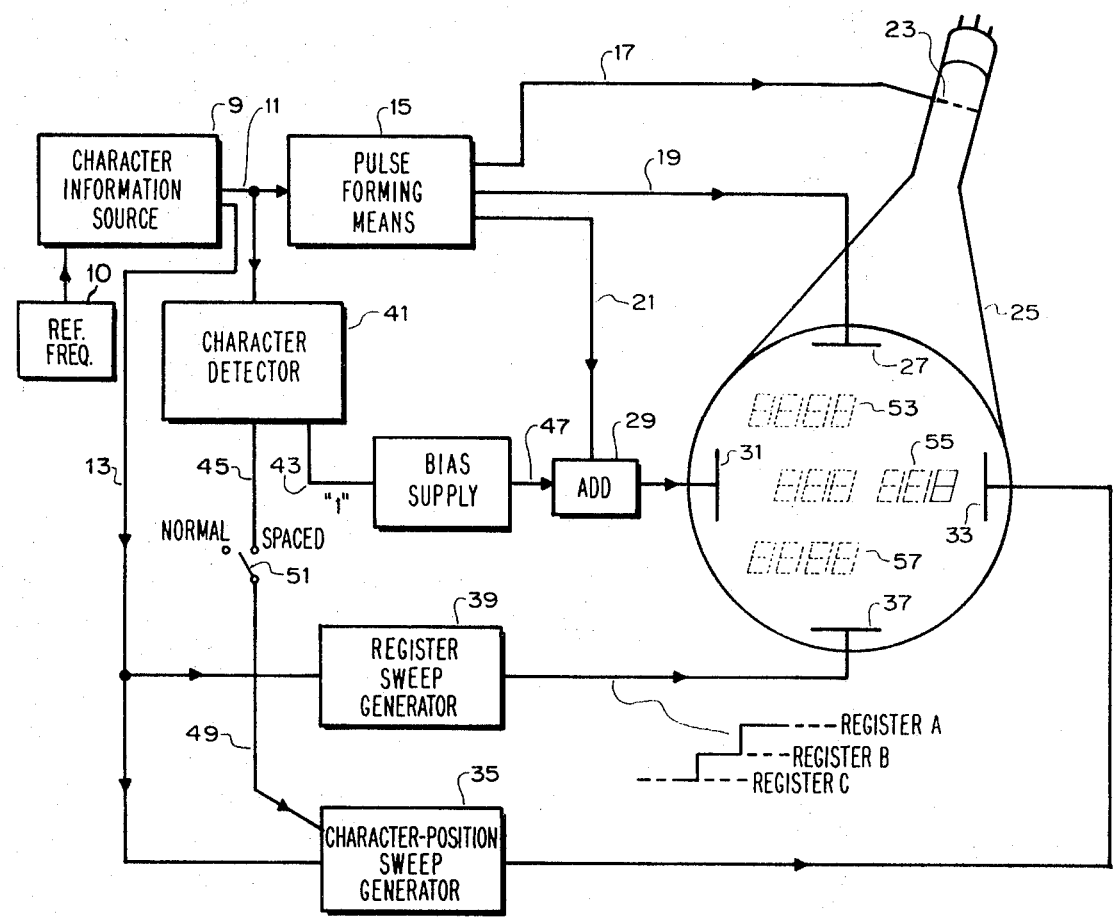
FIG. 1 is a block diagram of the character display apparatus of the present invention.
Figure 2:
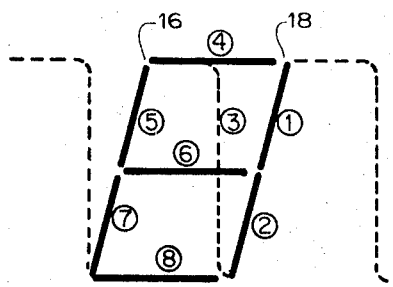
FIG. 2 is a pictorial representation of the display pattern.
Figure 3:
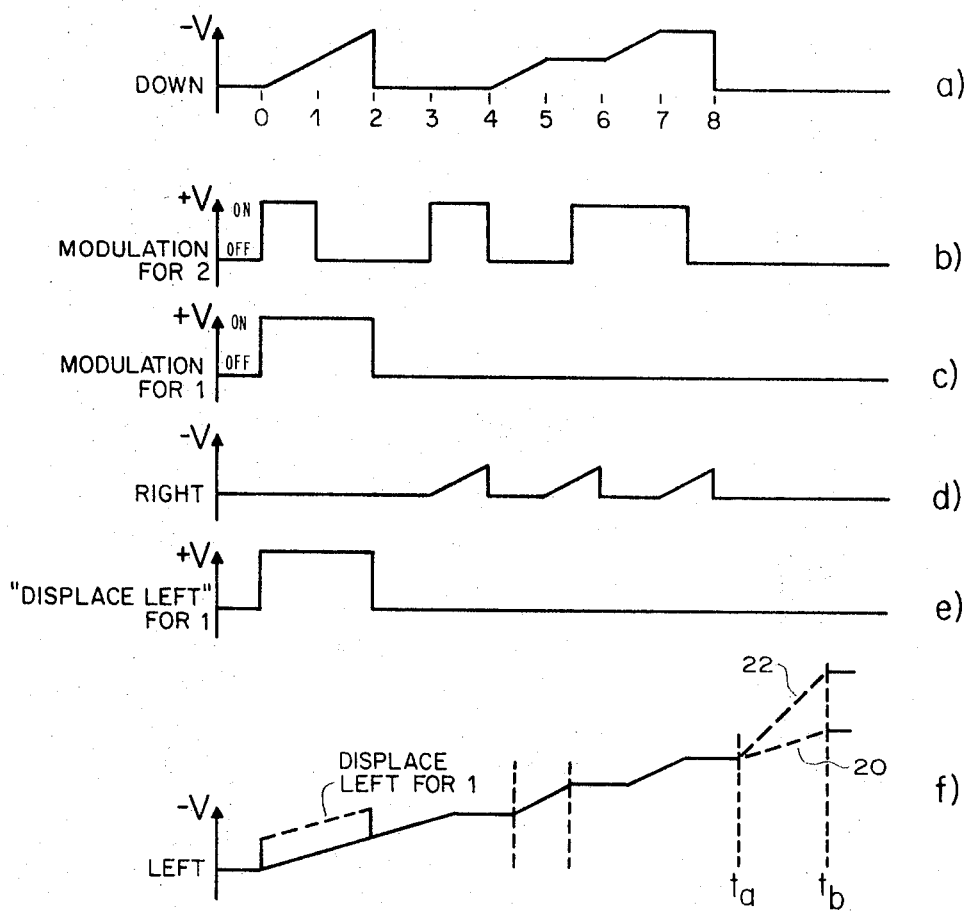
FIGS. 3a and 3d are graphs showing various waveforms as a function of time that are produced during the operation of the apparatus of FIG. 1.

Referring now to the apparatus of FIG. 1, there is shown a source 9 of the character information that is to be displayed. This source 9 may be an electronic counter or an arithmetic calculating device, or the like, which produces output information on line 11 in the form of coded alphanumeric characters or digits in synchronism with a reference frequency from source 10. The source 9 may also produce a plurality of lines of such output information which should be displayed simultaneously for convenience, as in the case of an arithmetic calculating device wherein the lines of information to be displayed are the digits in each of a plural number of registers. Signal information from source 9 relating to the particular register designation of successive digits may appear on line 13. The pulse-forming means 15 receives the coded digit information on line 11 and produces a succession of pulses on each of output lines 17, 19 and 21, as shown in FIG. 2. The pulses on line 17 (FIGS. 3b or 3c) are applied to the blanking grid 23 of the cathode-ray display tube 25, the pulses on line 19 (FIG. 3a) are applied to one vertical deflection plate 27 of the tube 25 and the pulses on line 21 (FIG. 3d) and the pulse on line 47 (FIG. 3e) are applied in selected combination to one horizontal deflection plate 31 of tube 25. A digit-positioning sweep signal (FIG. 3f) is applied to the other horizontal deflection plate 33 of tube 25 from the sweep generator 35 and a signal for vertically positioning the lines of digits on the display screen of tube 25 is applied to the vertical deflection plate 37 from the sweep generator 39. The amplitudes and time relationships of the pulses applied to the electrodes 23, 27, 31 and 33, as shown in FIG. 3, are selected to cause the electron beam of tube 25 to sweep through the segments designated ① through ⑧ to form a succession of I-shaped and E-shaped sweep patterns, as shown in FIG. 2. These patterns are displayed close together to form a "figure 8"-shaped pattern and to provide requisite, uniform spacing between adjacent digits that are formed in a line from right to left. Of course, the E-shaped sweep patterns may also be 3-shaped sweep patterns disposed to the right of I-shaped sweep patterns so, for clarity and brevity, the 3-shaped (or inverted E-shaped) and E-shaped patterns are all collectively referred to herein as "E-shaped" sweep patterns.

Pulse-forming means 15 may supply to grid 23 of tube 25 other blanking signals than the signals shown in FIGS. 3a and 3b in accordance with digit code information received from source 9 for blanking selected segments of these "figure 8" patterns to form in a conventional manner other desired digits than the digits 2 and 1, respectively. The use of a succession of I-shaped and E-shaped sweep patterns, as shown in FIG. 2, permits circuit simplifications not conveniently possible with conventionally used 8-shaped sweep patterns. The electron beam of tube 25 starts out from a reference point 16, 18 for each of the I- and E-shaped sweep patterns and is deflected from there only either down or to the right during formation of a display character. The circuitry for producing the appropriate waveforms, as shown in FIG. 3, need only sweep in one direction with respect to a reference potential, say ground, and thus may be reset to ground after formation of each portion of the display character. Also, the I-shaped sweep pattern to the right of an E-shaped sweep pattern may be formed in a shorter period of time than is required to form a pair of adjacent E-shaped patterns. This permits the line (or lines) of display characters to be cycled for display more frequently within the response time of an observer's eye.

The signals (FIG. 3d) applied to the horizontal deflection plate 31 from the pulse-forming means 15 are altered in accordance with the present invention to center such narrow digits or characters as a 1 or a radix point, or the like, within the normal area of a "figure 8" sweep pattern so that such narrow characters are displayed centered between adjacent characters. When a narrow character is to be displayed, the coded information on line 11 relating to such character is detected by the character detector 41 which includes logic elements and gates for producing an output on line 43 that indicates the presence of such narrow characters. Signal on line 43 activates the bias supply 45 to supply an incremental deflection voltage 47, as shown in FIG. 3e, only for the duration of such narrow character. This incremental voltage 47 and the pulse signals on line 21 from pulse-forming means 15 are combined in adder 29 and are applied to the horizontal deflection plate 31 of tube 25. This produces a net differential displacement voltage across the horizontal deflection plates 31 and 33, as shown in FIG. 3f, which causes the electron beam to shift the I-shaped portion of the "figure 8" sweep pattern about a half-character space to center the narrow character between adjacent characters formed in the normal, unshifted positions of "figure 8" sweep patterns.

The characters formed from the selective blanking of the "figure 8" sweep patterns are spaced across the display screen of tube 25 by the deflection voltage that is applied to the deflection plate 33 from the sweep generator 35. This deflection voltage, as shown in FIG. 3f, changes amplitude with time at selected periods during the formation of a character to provide skewed characters and it also changes with time between characters to provide the requisite spacing. Sweep generator 35 may thus include a signal-controlled integrator for producing the desired change in deflection voltage with time between characters in response to signal applied thereto along signal path 13 from the source 9 of character information.

The character detector 41 may also serve to detect the occurrence of a selected number of characters or digits in succession and to produce an output on line 45 in response to each recurrence of such selected number of characters. In practice, this may be accomplished using such conventional means as a limited-bit register or analog-totalizing device and may be arranged to produce the output on line 45 after each recurrence of, say, three digits. The output on line 45 may thus be used to form spaced groups of three digits each along a line of displayed digits. This simulates the punctuation of a long series of digits at each third digit and thus enables an observer to interpret the line of digits more conveniently and accurately.

The spacing of digits in this manner is accomplished by operating the sweep generator 35 to produce a greater change in amplitude during the time interval between the formation of successive characters, as shown between times $t_a$ and $t_b$ in FIG. 3f. In practice, an integrator included within sweep generator 35 may receive additional signal to integrate in response to signal applied thereto along line 49. Thus sweep generator 35 produces a normal or first rate of change 20 of sweep voltage with time, as shown between times $t_a$ and $t_b$ in FIG. 3f, in response to actuating signal applied thereto along signal path 13 and also produces a second, faster rate of change 22 of sweep voltage with time, as shown between times $t_a$ and $t_b$ in FIG. 3f, in response to the signal on line 49 additionally applied thereto. The displayed characters are thus normally or uniformly spaced with the switch 51 that couples lines 45 and 49 set in the open or NORMAL position and are grouped into spaced groups of three digits each with the switch 51 set in the closed or SPACED position.

A plurality of character display lines 53, 55 and 57 may be provided on the display screen of tube 25 by varying the deflection voltage applied to the vertical deflection plate 37 from sweep generator 39. This sweep voltage remains substantially constant during the formation of an entire line of characters and then changes to a new value that positions the line of sweep patterns at a different vertical position on the display screen of tube 25, as shown in FIG. 1. The sweep signal from generator 39 thus changes amplitude in response to signal applied thereto along signal path 13 from the source 9, which signal designates the end of an entire line of characters.

The sweep signals, as shown in FIGS. 1 and 3, for producing an entire line (or lines) of characters may occur within a few milliseconds, these sweep signals may be generated repetitively to produce a continuous, flicker-free visual indication on the display screen of tube 25. However, the rate at which the characters from source 9 may be repeatedly displayed is synchronized to the reference frequency from source 10. This prevents the source 9 from repeating the line or lines of characters after a previous display at a repetition rate which would increase as the length of a line or lines of characters decreased. Since the display of characters may recur several times within the response time of an observer's eye, an increased repetition rate of display on shorter lines of characters would be perceived with increased intensity. Thus synchronization of the repetition rate of display to a reference frequency, say the frequency of power line signal, eliminates modulation of the intensity of the characters displayed as a function of the number of characters displayed. Synchronism to the frequency of power line signal also eliminates position modulation of the characters due to magnetic deflection caused by the magnetic fields associated with line-operated apparatus disposed near tube 25.

We claim:

1. Character display apparatus comprising:
   display means for producing a visual indication along coordinate axes in response to a signal for each of the coordinate axes applied thereto, said display means being capable of selectively inhibiting a visual indication of applied signals in response to blanking signal applied thereto;
   a source of character information;
   circuit means coupled to said source and responsive to character information received therefrom for applying signals to said display means for each of the coordinate axes and for applying blanking signal thereto to produce a visual indication of a plurality of spaced characters representative of information from said source; and
   means coupled to said source and said display means and responsive to information from said source that is representative of a selected character which is formed as a line segment substantially only along one coordinate axis for shifting the position of the displayed line segment in a selected direction along said other coordinate axis for substantially centering the displayed selected character with respect to adjacent displayed characters.

2. Apparatus as in claim 1 for operation on power line signal wherein: said source is synchronized to power line signal frequency for supplying character information to the circuit means at a repetition rate proportional to the power line signal frequency.

3. Apparatus as in claim 1 wherein:
   said display means is a cathode-ray tube having longitudinal and vertical deflection circuits;
   said means includes pulse-forming circuit connected to apply pulses to said horizontal deflection circuit; and
   said means also includes a supply of steady voltage and a circuit connected thereto for applying the combination of said pulse signals and steady voltage to the horizontal deflection circuit during the appearance of said selected character to center the display of the same between adjacent displayed characters.

4. Character display apparatus comprising:
   display means including a cathode-ray display tube having electron-beam writing means and coordinate-axes beam deflecting inputs and a display-blanking input for producing a visual indication along coordinate axes in response to a signal for each of the coordinate axes applied to the respective beam-deflecting input, said display means being capable of selectively inhibiting a visual indication of applied signals in response to blanking signal applied to said display-blanking input; and
   circuit means coupled to said display means for applying signals to said beam-deflecting inputs and for applying blanking signal to said display-blanking input for deflecting the beam through a substantially E-shaped pattern substantially contiguous an I-shaped pattern and for selectively blanking portions of said patterns for displaying a selected character as the combination of selectively unblanked portions of substantially contiguous E-shaped and I-shaped patterns.

5. Character display apparatus comprising:
   display means including a cathode-ray tube having deflection circuitry for a horizontal axis and a substantially vertical coordinate axis for producing a visual indication along the coordinate axes in response to signals applied to the deflection circuitry for the coordinate axes, said display means being capable of selectively inhibiting visual indication of applied signals in response to blanking signal applied thereto;
   a source of character information;
   circuit means connected to said source and responsive to character information received therefrom for applying signals to said deflection circuitry of the display means for each of the coordinate axes and for applying blanking signal thereto to produce a visual indication of a plurality of spaced characters representative of information from said source; and
   means including a sweep generator connected to said source and to the horizontal deflection circuitry for spacing the displayed characters along the horizontal axis, said sweep generator being capable of supplying to the horizontal deflection circuitry a sweep voltage which varies with time at one rate during a time interval between occurrences of character information from said source and at a faster rate during the time interval between the occurrences of character information from said source following the occurrence of a selected plural number of characters.

6. Apparatus as in claim 4 for operation on power line signal wherein: said circuit means is synchronized to power line signal frequency for supplying said signals to the beam-deflecting inputs at a repetition rate proportional to the power line signal frequency.

7. Apparatus as in claim 5 for operation on power line signal wherein: said source is synchronized to power line signal frequency for supplying character information to the circuit means at a repetition rate proportional to the power line signal frequency.